United States Patent
Horng et al.

(10) Patent No.: US 6,922,038 B2
(45) Date of Patent: *Jul. 26, 2005

(54) SPEED CONTROL CIRCUIT FOR A DC BRUSHLESS MOTOR

(75) Inventors: Alex Horng, Kaohsiung (TW); Ying-Ya Lu, Kaohsiung Hsien (TW); Ta-Lun Ko, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/856,954

(22) Filed: Jun. 1, 2004

(65) Prior Publication Data

US 2004/0217730 A1 Nov. 4, 2004

Related U.S. Application Data

(63) Continuation-in-part of application No. 10/126,578, filed on Apr. 22, 2002, now Pat. No. 6,822,419.

(51) Int. Cl.$^7$ .............................. H02P 1/34; H02P 1/42; H02P 2/18; H02P 5/28; H02P 7/36
(52) U.S. Cl. ....................... 318/825; 318/254; 318/806; 318/439; 318/747; 318/816
(58) Field of Search .............................. 318/254, 825, 318/138, 434, 439, 806, 816, 747, 727, 772; 388/815, 934; 62/228.4

(56) References Cited

U.S. PATENT DOCUMENTS

| | | | | |
|---|---|---|---|---|
| 3,680,655 A | * | 8/1972 | Beyerlein et al. | 180/54.1 |
| 4,019,606 A | * | 4/1977 | Caputo et al. | 187/394 |
| 4,286,198 A | * | 8/1981 | de Valroger | 318/138 |
| 4,321,515 A | * | 3/1982 | Honda | 318/6 |
| 4,341,984 A | * | 7/1982 | Parker et al. | 318/138 |
| 4,896,084 A | * | 1/1990 | Maue et al. | 318/280 |
| 5,023,527 A | * | 6/1991 | Erdman et al. | 318/254 |
| 5,731,674 A | * | 3/1998 | Jeske | 318/439 |
| 5,929,576 A | * | 7/1999 | Yasohara et al. | 318/254 |
| 6,172,476 B1 | * | 1/2001 | Tolbert et al. | 318/772 |
| 6,236,179 B1 | * | 5/2001 | Lawler et al. | 318/439 |
| 6,304,046 B1 | * | 10/2001 | Lee et al. | 318/439 |
| 6,822,419 B2 | * | 11/2004 | Horng et al. | 318/825 |

* cited by examiner

*Primary Examiner*—David Martin
*Assistant Examiner*—Renata McCloud
(74) *Attorney, Agent, or Firm*—Bacon & Thomas, PLLC

(57) ABSTRACT

A speed control circuit for a dc brushless motor includes a switch circuit and a voltage-detection circuit. The voltage-detection circuit is actuated depending upon high or low voltage of power supply to thereby cause the switch circuit to output high or low operating voltage to a driver circuit of the motor in response to changes of the voltage of the power supply. The motor is adjusted and operated at desired speeds by a rated range of input voltages according to the high or low operating voltage.

6 Claims, 5 Drawing Sheets

SPEED CONTROL CIRCUIT FOR A DC BRUSHLESS MOTOR

CROSS REFERENCE TO RELATED APPLICATION

This application is a continuation-in-part application of U.S. patent Ser. No. 10/126,578, filed on Apr. 22, 2002 now U.S. Pat. No. 6,822,419.

BACKGROUND OF THE INVENTION

1. Field of the Invention

The present invention relates to a speed control circuit for a dc brushless motor and more particularly to a switch circuit and a voltage-detection circuit for changing speeds of the dc brushless motor in response to changes in voltage of the power supply.

2. Description of the Related Art

Currently, fans are used for forced air cooling of the electronic devices, such as power supply, CPU of a computer, display card, and computer components etc. Recently, there is a trend to adjustably operate fans at high or low speed depending upon ambient conditions. In high temperature ambiance, a fan must operate at high speed to reduce or remove heat produced by electronic components so as to ensure that these electronic components are operated normally and that the heat will not damage the electronic components. In low temperature ambiance, the fan must operate at low adequate speed for saving power and decreasing noise.

FIG. 1 illustrates a schematic view of a conventional driver circuit for a single phase dc brushless motor.

Referring to FIG. 1, the driver circuit for the single phase dc brushless motor includes a coil L1, a Hall element IC1, a driver element IC2, and a capacitor C1. The Hall element IC1 is used for detecting changes of a permanent magnetic field of a rotor to thereby output weaker Hall voltage. And then the Hall voltage is magnified by the driver circuit IC2 to further output alternative signals (square waveforms) from two terminals O1 and O2 to the bridging transistors Q1 through Q4. The coil L1 is actuated in turn to change current in direction so as to rotate the rotor.

FIG. 2 illustrates a schematic view of a conventional driver circuit for a double phase dc brushless motor.

Referring to FIG. 2, the driver circuit for the double phase dc brushless motor includes a first coil L1, a second coil L2, a capacitor C1, a Hall driver element IC3, a first resistor R1, a second resistor R2, and a transistor Q1. The resistors R1 and R2 and transistor Q1 form a rotational speed detective circuit. The Hall driver element IC3 is used for detecting changes of a permanent magnetic field of a rotor and then the Hall voltage is magnified to output alternative signals (square waveforms) from two terminals O1 and O2 to the coils L1 and L2 respectively. The coils L1 and L2 are actuated in turn to change current so as to rotate the rotor.

In a cooling fan system, there is generally provided two voltage levels to a driver circuit for various desired amounts of forced air. For example, a high voltage level of 12V controls a fan operating at 3000 rpm, and a low voltage level of 6V at 1500 rpm. Therefore, the cooling fan system operates at different speeds to provide cooling capacity depending upon the ambient conditions.

FIG. 3 illustrates a voltage diagram for speed of a conventional dc brushless motor. Between two specific voltages, ranging from 12V to 6V for example, are a high and a low speed. However, the voltage-to-speed curve is nonlinear. When 12V is input to the cooling fan system, the motor is operated at the high speed of 3000 rpm; but when the cooling fan system input is changed to 6V, the motor is operated at a low speed of 2000 rpm as a result of the non-linearity. Accordingly, the cooling fan system fails to certainly operate at a predetermined low speed of 1500 rpm to meet the system demand.

The motor structure and the nonlinear feature limit the conventional dc brushless motor whose speed cannot be adjusted depending upon the system needs. In order to improve these limitations of the conventional motor to perform desired speeds, it is necessary to be redesigned.

The present invention intends to provide a speed control circuit comprising a switch circuit and a voltage-detection circuit used for adjusting an operating voltage depending upon speeds of the motor. The operating voltage of desired speed of the motor is determined by the rated range of input voltage in such a way to mitigate and overcome the above problem.

SUMMARY OF THE INVENTION

The primary objective of this invention is to provide a speed control circuit for a dc brushless motor comprising a switch circuit and a voltage-detection circuit used for adjusting operating voltage depending upon speeds of the motor.

The secondary objective of this invention is to provide a speed control circuit for a dc brushless motor using a switch circuit to determine an operating voltage of low speed.

The present invention is a speed control circuit for a dc brushless motor. The speed control circuit includes a switch circuit and a voltage-detection circuit. The voltage-detection circuit is actuated depending upon high or low voltage of power supply to thereby cause the switch circuit to output a high or low operating voltage to a driver circuit of the motor in response to changes of the voltage of the power supply. The motor is adjusted and operated at desired speeds by a rated range of input voltages according to the high or low operating voltage.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings wherein.

DETAILED DESCRIPTION OF THE INVENTION

Figure 1:
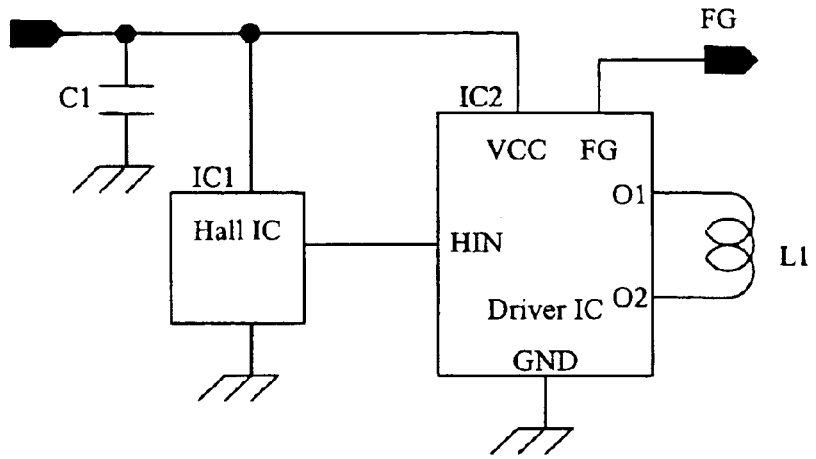
FIG. 1 is a schematic view of a conventional driver circuit for a single phase dc brushless motor.

Referring now to the drawings, there are two embodiments of the present invention shown therein, which generally include a driver member and a speed control member.

Figure 4:
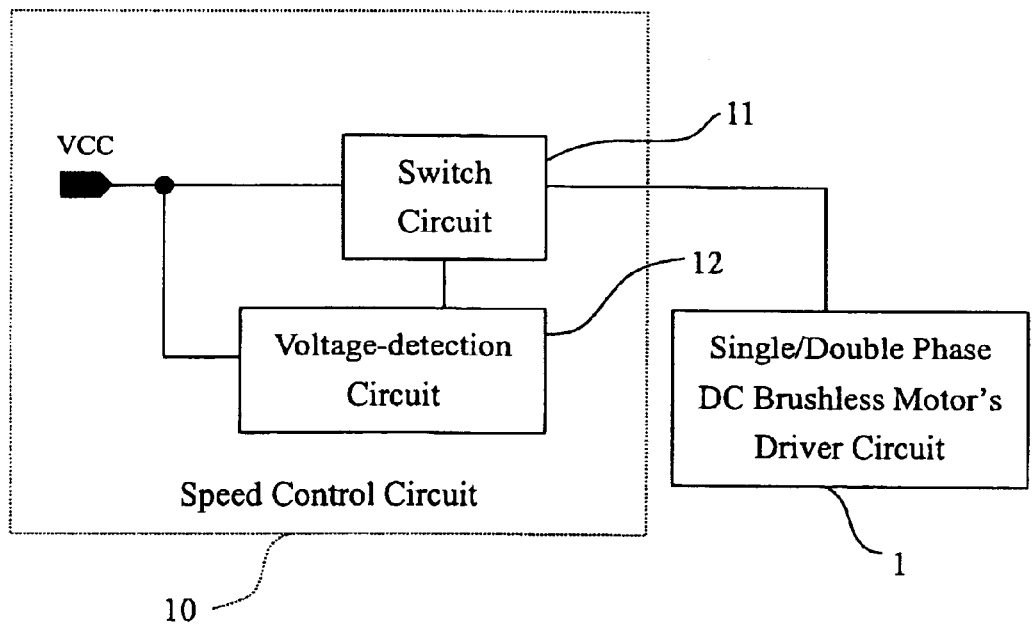
FIG. 4 is a block diagram of a speed control circuit for a dc brushless motor in accordance with the present invention.

FIG. 4 illustrates a block diagram of a speed control circuit for a dc brushless motor in accordance with the present invention.

Referring initially to FIG. 4, the speed control circuit 10 includes a switch circuit 11 comprising an adjusting resistor and a voltage-detection circuit 12. The switch circuit 11 is adapted to control power supply to output a high or low operating voltage to a driver circuit 1 of the motor. And the voltage-detection circuit 12 is adapted depending upon high or low voltage of the power supply to actuate the switch circuit 11 in response to changes of the voltages of the power supply.

Figure 5:
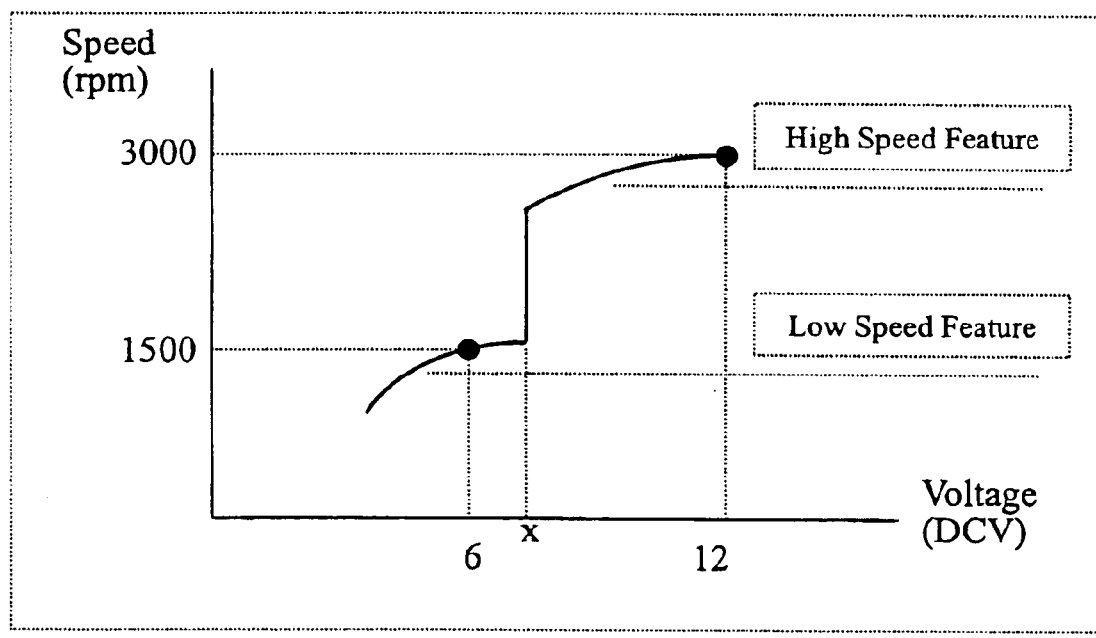
FIG. 5 is a voltage diagram for speed of a speed control circuit in accordance with the present invention.

FIG. 5 illustrates a voltage diagram for speed of a speed control circuit in accordance with the present invention. Referring to FIGS. 4 and 5, when a high voltage of 12V is input to the system, the switch circuit 11 is actuated to be closed by the voltage-detection circuit 12 and thus the motor can be input a high operating voltage of 12V input from the switch circuit 11. The motor is capable of operating and maintaining at a high speed of 3000 rpm until the input operating voltage is changed to a low voltage. When the system input is changed to a low voltage of 6V, the switch circuit 11 is actuated to be opened by the voltage-detection circuit 12 and thus the motor can be input a predetermined low operating voltage of xV dropped by the adjusting resistor. Consequently, the motor is capable of operating and maintaining at a low speed of 1500 rpm.

Figure 6:
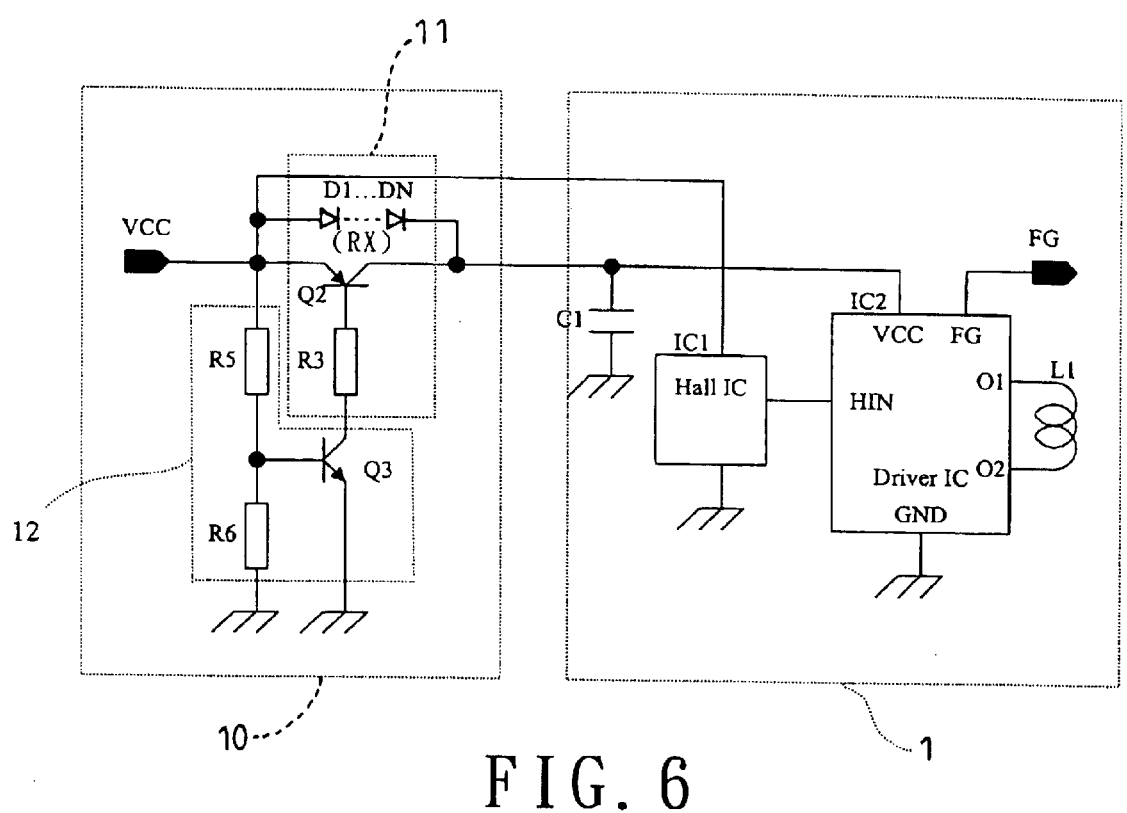
FIG. 6 is a schematic view of a speed control circuit in accordance with a third embodiment of the present invention applied in a driver circuit for a single phase dc brushless motor.

FIG. 6 illustrates a speed control circuit in accordance with a first embodiment of the present invention applied in a driver circuit for a single phase dc brushless motor. Referring to FIGS. 1 and 6, reference numerals of the first embodiment have applied the identical numerals of the conventional single phase dc brushless motor. The driver circuit of the first embodiment has the similar configuration and same function as the conventional driver circuit and the detailed descriptions are omitted.

Referring now to FIG. 6, the speed control circuit 10 in accordance with the first embodiment of the present invention is connected to the driver circuit 1 of the single phase dc brushless motor. The speed control circuit 10 includes a switch circuit 11 consisting of a transistor Q2, a resistor R3, and a plurality of diodes D1 through Dn. The diodes D1 through Dn form a diode set that may provide with an adjusting resistance Rx. When the transistor Q2 is cut off, the voltage of the power supply Vcc is shunted to the diodes D1 through Dn and thereby adjusted and dropped. And then this voltage drop is output to the driver circuit 1 of the motor.

Referring again to FIG. 6, the speed control circuit 10 further includes a voltage-detection circuit 12 including a transistor Q3, a resistor R5, and a resistor R6. When the transistor Q3 is saturated, a current from the power supply Vcc can pass a base of the transistor Q2 and the resistor R3 to form a bias current between a collector and an emitter of the transistor Q3. Consequently, the transistor Q2 is saturated, and the power supply Vcc is output to the driver circuit 1 through an emitter and a collector of the transistor Q2 so as to output a high operating voltage. This high operating voltage is input into the driver circuit 1 and thus the motor (coil L1) is operated at high speed, as shown in FIG. 5. When the transistor Q3 is cut off, the voltage of the collector of the transistor Q3 rises and cuts off a bias current between an emitter and a base of the transistor Q2. Consequently, the transistor Q2 (bias current) is cut off, and the power supply Vcc is input into the diodes D1 through Dn and dropped so as to output a low operating voltage. This low operating voltage is input into the driver circuit 1 and thus the motor (coil L1) is operated at low speed, as shown in FIG. 5. The resistors R5 and R6 form a voltage divider. The voltage divider divides the voltage of the power supply Vcc to output a high voltage level (0.6–0.7V) to saturate the transistor Q3 when the power supply has risen above a reference voltage (xV). The transistor Q2 is actuated to saturate by means of switching to saturate the transistor Q3. By contrast, the voltage divider outputs a low voltage level to cut off the transistor Q3 when the power supply has fallen below the reference voltage. Similarly, the transistor Q2 is actuated to cut off by means of switching to cut off the transistor Q3.

Figure 2:
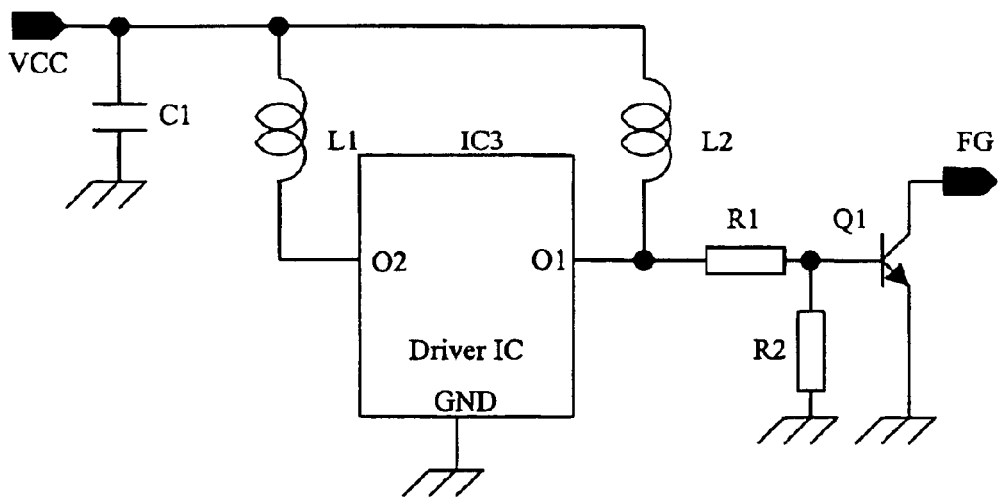
FIG. 2 is a schematic view of a conventional driver circuit for a double phase dc brushless motor.
Figure 3:
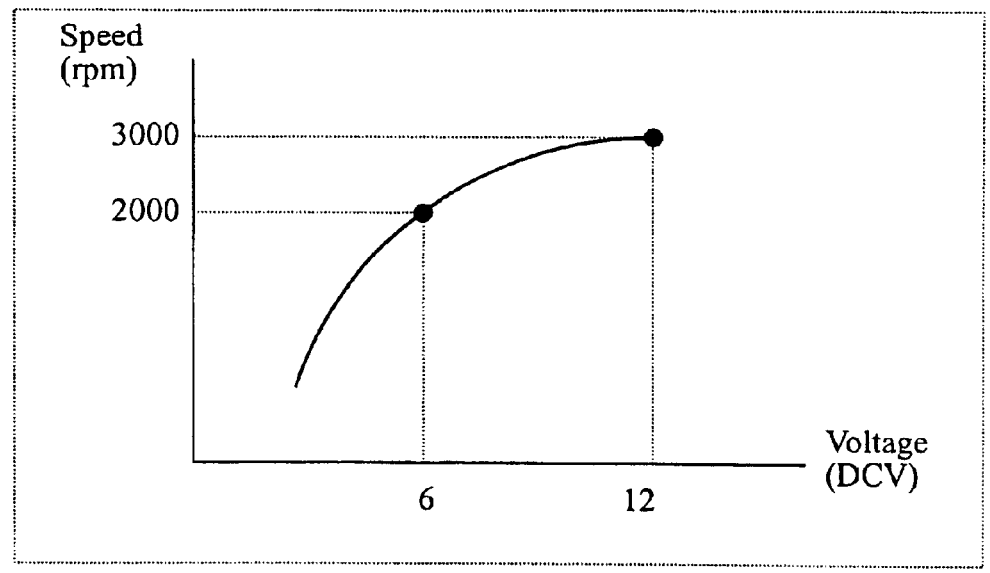
FIG. 3 is a voltage diagram for speed of a conventional dc brushless motor.
Figure 7:
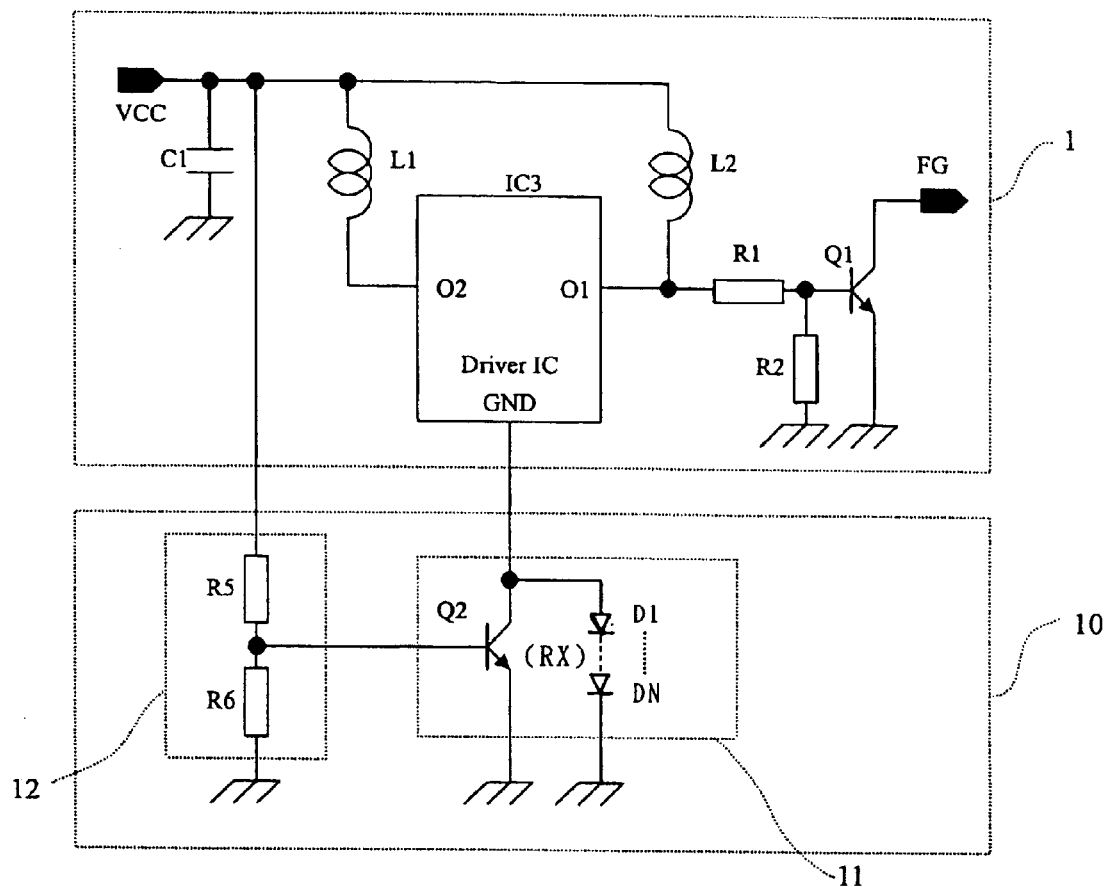
FIG. 7 is a schematic view of a speed control circuit in accordance with a fourth embodiment of the present invention applied in a driver circuit for a double phase dc brushless motor.

FIG. 7 illustrates a speed control circuit in accordance with a second embodiment of the present invention applied in a driver circuit for a double phase dc brushless motor. Referring to FIGS. 2 and 7, reference numerals of the second embodiment have applied the identical numerals of the conventional double phase dc brushless motor. The driver circuit of the second embodiment has the similar configuration and same function as the conventional driver circuit and the detailed descriptions are omitted.

Referring now to FIG. 7, the speed control circuit 10 in accordance with the second embodiment of the present invention is connected to the driver circuit 1 of the double phase dc brushless motor. The speed control circuit 10 includes a switch circuit 11 consisting of a transistor Q2, and a plurality of diodes D1 through Dn. The diodes D1 through Dn provide with an adjusting resistor Rx. When the transistor Q2 is cut off, the Hall driver circuit IC3 is dropped by the diodes D1 through Dn and then grounded. Thus the motor is operated at low speed, as shown in FIG. 5. When the transistor Q2 is saturated, the Hall driver circuit IC3 is grounded through a collector and an emitter of the transistor Q2. Thus the motor is operated at high speed, as shown in FIG. 5.

Referring again to FIG. 7, the speed control circuit 10 further includes a voltage-detection circuit 12 including a resistor R5, and a resistor R6. The resistors R5 and R6 form a voltage divider. The voltage divider divides the voltage of the power supply Vcc to output a high voltage level (0.6–0.7V) to saturate the transistor Q2 when the power supply has risen above a reference voltage (xV). Consequently, the Hall driver circuit IC3 is grounded through the transistor Q2 and the coils L1 and L2 are operated at the high operating voltage. By contrast, the voltage divider outputs a low voltage level to cut off the transistor Q2 when the power supply has fallen below the reference voltage. Consequently, the Hall driver circuit IC3 is grounded through the diodes D1 through Dn and the coils L1 and L2 are operated at the low operating voltage.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A speed control circuit for a dc brushless motor, wherein said speed control circuit is applied to a single phase dc brushless dc motor, comprising:
   a switch circuit including a plurality of diodes to output a high or low operating voltage to a driver circuit of the motor in response to high and low voltages input from a power supply; and
   a voltage-detection circuit controlling the switch circuit to switch between the high or low operating voltage in response to changes in the voltage of the power supply;

wherein when the voltage-detection circuit senses a high voltage input from the power supply, the switch circuit is actuated to output the high operating voltage to the driver circuit and thus the motor is operated at a high speed;

wherein when the voltage-detection circuit senses a low voltage input from the power supply, the switch circuit is actuated to output the low operating voltage to the driver circuit and thus the motor is operated at a low speed, the low operating voltage being adjusted by the switch circuit relative to the low voltage input from the power supply.

2. The speed control circuit for a dc brushless motor as defined in claim 1, wherein the switch circuit further includes a first transistor and a first resistor; the voltage-detection circuit includes a second transistor; when the second transistor is saturated resulting in saturation of the first transistor, the power supply is output to the driver circuit through the first transistor so as to output the high operating voltage to the driver circuit and thus the motor is operated at the high speed; and wherein when the second transistor is cut off resulting in cutting off the first transistor, a voltage of the power supply is reduced by a resistance provided with the diodes so as to output the adjusted low operating voltage to the driver circuit and thus the motor is operated at the low speed.

3. The speed control circuit for a dc brushless motor as defined in claim 2, wherein the voltage-detection circuit further includes a second resistor and a third resistor arranged to form a voltage divider; wherein when the power supply voltage has risen above a reference voltage, the voltage divider divides the voltage of the power supply to output the high voltage level to saturate the second transistor and subsequently saturate the first transistor; and wherein when the power supply has fallen below the reference voltage, the voltage divider outputs predetermined low voltage level to cut off the second transistor and subsequently cut off the first transistor.

4. A speed control circuit for a dc brushless motor, wherein said speed control circuit is applied to a double phase dc brushless dc motor, comprising:

a switch circuit including a plurality of diodes to output a high or low operating voltage to a driver circuit of the motor in response to high and low voltages input from a power supply; and a voltage-detection circuit controlling the switch circuit to switch between the high or low operating voltage in response to changes in the voltage of the power supply;

wherein when the voltage-detection circuit senses a high voltage input from the power supply, the switch circuit is actuated to output the high operating voltage to the driver circuit and thus the motor is operated at a high speed;

wherein when the voltage-detection circuit senses a low voltage input from the power supply, the switch circuit is actuated to output the low operating voltage to the driver circuit and thus the motor is operated at a low speed, the low operating voltage being adjusted by the switch circuit relative to the low voltage input from the power supply.

5. The speed control circuit for a dc brushless motor as defined in claim 4, wherein the switch circuit further includes a transistor; the voltage-detection circuit includes a first resistor and a second resistor; wherein when the transistor is cut off, a Hall driver circuit is dropped by a resistance provided with the diodes to ground and the motor is operated at the low speed; and wherein when the transistor is saturated, the Hall driver circuit is grounded through the transistor and thus the motor is operated at the high speed.

6. The speed control circuit for a dc brushless motor as defined in claim 5, wherein the first resistor and the second resistor form a voltage divider; wherein when the power supply voltage has risen above a reference voltage, the voltage divider divides the voltage of the power supply to output a high voltage level to saturate the transistor and consequently the Hall driver circuit is grounded; and wherein when the power supply voltage has fallen below the reference voltage, the transistor is cut off and consequently the Hall driver circuit is grounded through the diodes.

* * * * *